(12) United States Patent
Schwenter et al.

(10) Patent No.: US 12,009,143 B2
(45) Date of Patent: Jun. 11, 2024

(54) METHOD OF PRODUCING A COIL DEVICE, COIL DEVICE, MEASURING TRANSDUCER WITH COIL DEVICE, INSTRUMENT HAVING A MEASURING TRANSDUCER

(71) Applicant: Endress+Hauser Flowtec AG, Reinach (CH)

(72) Inventors: Benjamin Schwenter, Breitenbach (CH); Marc Werner, Grenzach-Wyhlen (DE); Claude Hollinger, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 597 days.

(21) Appl. No.: 17/266,980

(22) PCT Filed: Jul. 30, 2019

(86) PCT No.: PCT/EP2019/070489
§ 371 (c)(1),
(2) Date: Feb. 8, 2021

(87) PCT Pub. No.: WO2020/030473
PCT Pub. Date: Feb. 13, 2020

(65) Prior Publication Data
US 2021/0313108 A1  Oct. 7, 2021

(30) Foreign Application Priority Data
Aug. 8, 2018  (DE) .................... 10 2018 119 331.9

(51) Int. Cl.
*H01F 27/28*  (2006.01)
*G01F 1/84*  (2006.01)
(Continued)

(52) U.S. Cl.
CPC ....... *H01F 27/2804* (2013.01); *G01F 1/8422* (2013.01); *G01F 1/8427* (2013.01); *G01N 9/002* (2013.01); *H01F 41/043* (2013.01)

(58) Field of Classification Search
CPC .... H01F 27/2804; H01F 41/043; H01F 5/003; H01F 5/04; G01F 1/8422; G01F 1/8427; G01N 9/002; G01N 2009/006
See application file for complete search history.

(56) References Cited

U.S. PATENT DOCUMENTS 1,823,827 A * 9/1931 Franz ................. H01F 5/04
                                             336/208
3,792,398 A * 2/1974 Norlin ............... H01F 5/04
                                             336/198
(Continued)

FOREIGN PATENT DOCUMENTS

DE         19811578 A1    10/1999
DE     102009020733 A1    11/2010
(Continued)

OTHER PUBLICATIONS

Machine translation of DE 102015120087 (Year: 2017).*
(Continued)

*Primary Examiner* — David J Bolduc
(74) *Attorney, Agent, or Firm* — Kelly J. Smith; Endress+Hauser (USA) Holding, Inc.

(57) ABSTRACT

The present disclosure relates to a method of producing a coil device of an oscillation sensor or oscillation exciter of a measuring transducer or an instrument for measuring a density or a mass flow of a medium flowing through at least one measuring tube of the measuring transducer or instrument, to a coil device, to a measuring transducer, and to an instrument, wherein in a first method step a first end of an electrical connection line of the coil device is surrounded in a depression of a circuit board of the coil device with a metal (Continued)

microparticle paste, wherein in a second method step the metal microparticle paste is dried, wherein the drying process results in a hardening of the metal microparticle paste, so that a metal microparticle mass remains.

7 Claims, 5 Drawing Sheets

(51) Int. Cl.
    *G01N 9/00*     (2006.01)
    *H01F 41/04*     (2006.01)

(56) References Cited

U.S. PATENT DOCUMENTS

| | | | | |
|---|---|---|---|---|
| 4,422,338 A * | 12/1983 | Smith | G01F 1/8427 | 73/861.356 |
| 4,738,143 A * | 4/1988 | Cage | G01F 1/8413 | 73/861.355 |
| 4,756,198 A * | 7/1988 | Levien | G01F 1/8409 | 73/861.355 |
| 4,759,120 A * | 7/1988 | Bernstein | H01F 5/04 | 29/605 |
| 4,777,833 A * | 10/1988 | Carpenter | G01F 1/8427 | 73/861.355 |
| 5,046,153 A * | 9/1991 | Konopa | H01F 27/29 | 336/208 |
| 5,218,873 A * | 6/1993 | Lang | G01F 1/8495 | 73/861.357 |
| 5,235,305 A * | 8/1993 | Scheffler | H01F 27/29 | 439/74 |
| 5,349,872 A | 9/1994 | Kalotay et al. | | |
| 5,694,105 A * | 12/1997 | Weiner | H01F 5/04 | 336/208 |
| 5,696,478 A * | 12/1997 | Weiner | H05K 3/308 | 336/198 |
| 5,948,200 A * | 9/1999 | Nakazawa | H01F 41/043 | 156/89.16 |
| 5,999,079 A * | 12/1999 | Wille | H01F 5/04 | 336/208 |
| 6,051,448 A * | 4/2000 | Hayama | H05K 3/207 | 438/662 |
| 6,060,976 A * | 5/2000 | Yamaguchi | H01F 27/2804 | 336/200 |
| 9,927,380 B2 | 3/2018 | Muto et al. | | |
| 2002/0157480 A1* | 10/2002 | Bitto | G01F 1/8427 | 73/861.355 |
| 2003/0097882 A1* | 5/2003 | Schlosser | G01F 1/8495 | 73/861.355 |
| 2003/0140712 A1* | 7/2003 | Barger | G01F 1/844 | 73/861.354 |
| 2003/0233878 A1* | 12/2003 | Drahm | G01F 1/849 | 73/592 |
| 2004/0221661 A1* | 11/2004 | Bitto | G01F 1/8427 | 73/861.355 |
| 2006/0086196 A1* | 4/2006 | Rieder | G01F 1/8431 | 73/861.356 |
| 2006/0272428 A1* | 12/2006 | Rieder | G01F 1/849 | 73/861.357 |
| 2009/0079531 A1* | 3/2009 | Zach | H01F 5/003 | 336/200 |
| 2009/0173169 A1* | 7/2009 | Bitto | G01F 1/8418 | 73/861.355 |
| 2010/0257943 A1* | 10/2010 | Huber | G01N 9/002 | 73/861.357 |
| 2011/0309904 A1 | 12/2011 | Aoki et al. | | |
| 2012/0002387 A1* | 1/2012 | Park | H05B 41/02 | 361/679.01 |
| 2012/0090407 A1* | 4/2012 | Rieder | G01F 1/8495 | 73/861.357 |
| 2012/0319614 A1* | 12/2012 | Lee | H01F 27/325 | 315/254 |
| 2013/0027171 A1* | 1/2013 | Ito | H01F 41/042 | 336/200 |
| 2013/0076468 A1* | 3/2013 | Zurke | H01F 5/04 | 335/299 |
| 2013/0278374 A1* | 10/2013 | Thorslund | H01F 27/29 | 336/200 |
| 2014/0118100 A1* | 5/2014 | Sato | H01F 17/0013 | 336/200 |
| 2014/0137666 A1* | 5/2014 | Werbach | G01N 9/002 | 73/861.355 |
| 2015/0014899 A1* | 1/2015 | Hamada | H01F 41/046 | 264/611 |
| 2016/0336110 A1* | 11/2016 | Kitajima | H01F 17/04 | |
| 2017/0098501 A1* | 4/2017 | Flemming | H01F 41/041 | |
| 2017/0125153 A1 | 5/2017 | Yoshioka et al. | | |
| 2018/0182532 A1* | 6/2018 | Stahr | H01F 17/0013 | |
| 2018/0182535 A1* | 6/2018 | Tachibana | H01F 17/0013 | |
| 2018/0182536 A1* | 6/2018 | Tachibana | H01G 4/232 | |
| 2018/0254145 A1* | 9/2018 | Ishima | G03F 7/2022 | |
| 2019/0131036 A1* | 5/2019 | Mo | B29C 45/14065 | |
| 2019/0214184 A1* | 7/2019 | Mo | H01F 27/2823 | |
| 2019/0272938 A1* | 9/2019 | Mo | H01F 17/04 | |
| 2019/0272951 A1* | 9/2019 | Mo | H01F 41/041 | |
| 2019/0326055 A1* | 10/2019 | Bong | H01F 27/32 | |
| 2021/0065951 A1* | 3/2021 | Arai | H01F 5/003 | |
| 2021/0072062 A1* | 3/2021 | Chatzikonstantinou | G01F 1/8477 | |
| 2021/0202166 A1* | 7/2021 | Jansen | H01F 27/2804 | |

FOREIGN PATENT DOCUMENTS

| | | |
|---|---|---|
| DE | 102011053099 A1 | 4/2012 |
| DE | 102015103779 A1 | 9/2016 |
| DE | 102015120087 A1 | 5/2017 |
| DE | 202015120087 U1 | 5/2017 |
| DE | 202017006709 U1 | 2/2018 |
| DE | 202017006709 U1 | 3/2018 |
| DE | 102017106211 A1 | 7/2018 |

OTHER PUBLICATIONS

Pelco: "Colloidal Silver Paste-Product No. 16032", Oct. 22, 2009 (Oct. 22, 2009), XP055891254, Gefunden im Internet: URL:https://www.tedpella.com/technote_html/16032%20TN.pdf (gefunden am Feb. 14, 2022).

* cited by examiner

METHOD OF PRODUCING A COIL DEVICE, COIL DEVICE, MEASURING TRANSDUCER WITH COIL DEVICE, INSTRUMENT HAVING A MEASURING TRANSDUCER

CROSS-REFERENCE TO RELATED APPLICATIONS

The present application is related to and claims the priority benefit of German Patent Application No. 10 2018 119 331.9, filed on Aug. 8, 2018 and International Patent Application No. PCT/EP2019/070489 filed on Jul. 30, 2019, the entire contents of which are incorporated herein by reference.

TECHNICAL FIELD

The invention relates: to a method of producing a coil device of an oscillation sensor or oscillation exciter of a measuring transducer or an instrument for measuring a density or a mass flow of a medium flowing through at least one measuring tube of the measuring transducer or instrument, to a coil device, to a measuring transducer with coil device and to an instrument having a measuring transducer.

BACKGROUND

Coil devices, which are applied as oscillation sensors or oscillation exciters, are known in the state of the art, such as, for example, shown in DE10201512087A1. In such case, an electrical, conductive trace of a coil device includes contact areas for applying electrical connection lines, which are secured to the contact areas, for example, by means of adhesive or soldering.

However, the securements known in the state of the art are susceptible to breaking, for example, as a result of vibrations.

SUMMARY

An object of the invention is to provide a method of producing a coil device, a coil device, a measuring transducer as well as an instrument comprising the measuring transducer, in the case of which a securement of an electrical connecting line to a coil device does not have the above mentioned disadvantages.

The object is achieved by a method of producing, by a coil device, by a measuring transducer, as well as by an instrument as defined in the present disclosure.

In the case of a method of the invention for producing a coil device of an oscillation sensor or oscillation exciter of a measuring transducer or an instrument for measuring a density or a mass flow of a medium flowing through at least one measuring tube of the measuring transducer or instrument, in a first method step a first end of an electrical connection line of the coil device is surrounded in a depression of a circuit board of the coil device with a metal microparticle paste, wherein in a second method step the metal microparticle paste is dried, wherein the drying process results in a hardening of the metal microparticle paste, so that a metal microparticle mass remains.

The metal microparticle paste fills, in such case, for example, at least 30% and preferably at least 60% and, especially, at least 80% of a volume of the depression.

A suitable metal microparticle paste can be obtained, for example, from Heraeus Germany GmbH Co. KG. For example, the silver paste with the designation ASP 131-06 can be utilized for implementing the invention.

In an embodiment, the surrounding is performed by introducing the first end and subsequent at least partial filling of the depression with the metal microparticle paste, or wherein the surrounding is performed by inserting the first end into the metal microparticle paste of the depression at least partially filled with the metal microparticle paste.

In an embodiment, the drying process includes a heating of the metal microparticle paste to a drying temperature of at least 150° C., and, especially, at least 180° C., and preferably at least 210° C.

In an embodiment, the drying process includes a holding of the drying temperature for at least 20 minutes, and, especially, at least 35 minutes, and preferably at least 50 minutes.

In an embodiment, a temperature adjusting from room temperature to drying temperature and/or from drying temperature to room temperature has a duration of at least 20 minutes, and, especially, at least 35 minutes, and preferably at least 50 minutes.

In an embodiment, particles of the metal microparticle paste have a maximum dimension of less than 50 micrometer, and, especially, less than 35 micrometer and preferably less than 20 micrometer.

The smaller a maximum dimension of the particle is, the greater is a ratio of particle surface area to particle volume, so that contact forces between separate particles become ever more dominant and lend the metal microparticle paste a sufficient strength.

It can be advantageous to perform the drying of the metal microparticle paste in a high pressure atmosphere of at least 3 bar, and preferably at least 5 bar and, especially, at least 10 bar.

A coil device of the invention for an oscillation sensor or oscillation exciter of a measuring transducer or an instrument for measuring a density or a mass flow of a medium flowing through at least one measuring tube of the measuring transducer or instrument, produced according to a version of the method as above described, comprises:

A circuit board having at least one circuit board layer, wherein each circuit board layer has a first face and an opposite, second face, at least one coil adapted for registering or producing a time varying magnetic field, wherein the coil is embodied at least sectionally by means of an electrically conductive trace, wherein the coil is arranged on the first face and/or second face of a circuit board layer, wherein the at least one coil has a first coil end and a second coil end, wherein the coil device has at least a first contacting element connected with the first coil end and at least a second contacting element connected with the second coil end, via which contacting elements the coil device is connectable by means of electrical connection lines to an electronic measuring/operating circuit of a Coriolis instrument, wherein the circuit board has in an edge area at least one depression having a floor and a border, wherein a contacting element is arranged on the floor of each depression, wherein at least one electrical connection line of the coil device has a first end, the first end is arranged in a depression, wherein the depression is filled at least partially with a solid metal microparticle mass, which holds the first end and forms an electrical connection between the electrical connection line and the contacting element.

The metal microparticle paste fills, in such case, for example, at least 30% and preferably at least 60% and, especially, at least 80% of a volume of the depression.

It is, in such case, advantageous that the metal microparticle ink wets the border.

In an embodiment, the border has in the region of the metal microparticle mass at least sectionally an unevenness, for example, in the form of a fluting or a stepping, which unevenness is adapted to hold the metal microparticle mass.

Preferably, the unevenness has perpendicularly to the border a height greater than half maximum dimension of the particles. In this way, the metal microparticle mass after termination of the drying process engages with the unevenness and is thereby held fixed.

In an embodiment, the metal microparticle mass comprises microparticles of at least one metal of the following list: silver, gold, copper, platinum, tantalum.

In an embodiment, the first end of the connection line is at least sectionally bent or folded. In this way, a slipping the electrical connection line out of the metal microparticle mass can be prevented.

A measuring transducer of the invention for an instrument for registering a mass flow or a density of a medium flowing through at least one measuring tube of the measuring transducer comprises:
  the at least one measuring tube having an inlet and an outlet and adapted to convey the medium between inlet and outlet;
  at least one oscillation exciter, which is adapted to excite the at least one measuring tube to execute oscillations;
  at least two oscillation sensors, which are adapted to register deflection of the oscillations of at least one measuring tube;
  wherein at least one oscillation exciter as well as the oscillation sensors have, in each case, a coil device with, in each case, at least one coil as well as, in each case, a magnet apparatus, wherein the magnet apparatus and the coil device are movable relative to one another, and
  wherein the magnet apparatus and the coil device of an oscillation exciter, or oscillation sensor, interact with one another by means of magnetic fields,
  wherein the oscillation sensors have, in each case, a coil device of the invention.

In an embodiment, the measuring transducer includes a support body having a support body chamber, which is adapted to house, and to seal media tightly from surroundings, the at least one measuring tube,
  wherein the at least one coil device is arranged in the support body chamber,
  wherein the support body chamber is filled with a non-corrosive, protective gas, which comprises, for example, nitrogen, helium or argon.

In an embodiment, the Coriolis measuring transducer includes a media-tight line feedthrough for feedthrough of the electrical connection lines.

An instrument of the invention comprises:
A measuring transducer of the invention; and
an electronic measuring/operating circuit, wherein the electronic measuring/operating circuit is adapted to operate the oscillation sensors and the oscillation exciter, and is connected by means of electrical connection lines with such,
  wherein the at least one electrical connection extends by means of a cable guide to the electronic measuring/operating circuit,
  wherein the electronic measuring/operating circuit is further adapted to ascertain mass flow measured values and/or density measurement values, and,
  wherein the instrument especially has an electronics housing for housing the electronic measuring/operating circuit.

BRIEF DESCRIPTION OF THE DRAWINGS

The invention will now be described based on examples of embodiments presented in the appended drawing, the figures of which show as follows.

DETAILED DESCRIPTION

Figure 1:
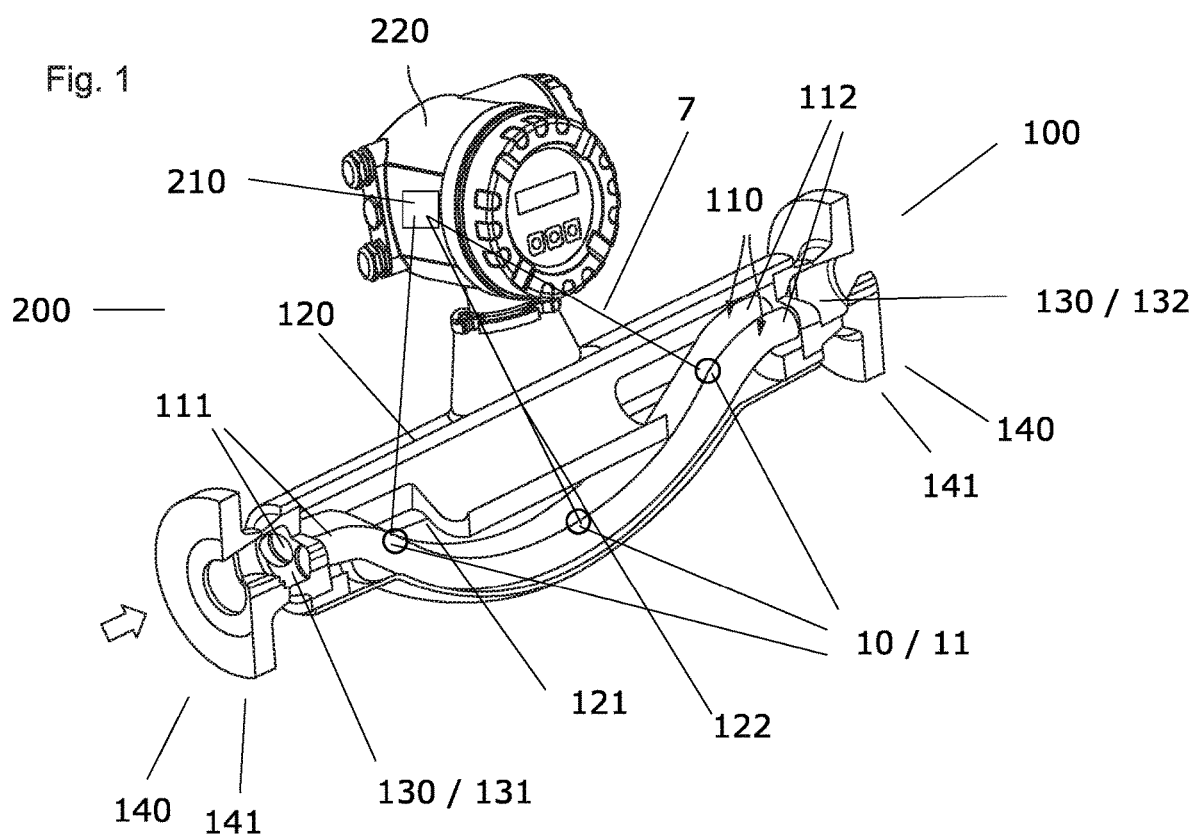
FIG. 1 shows an instrument 200 having a measuring transducer 100.

FIG. 1 shows an instrument 200 having a measuring transducer 100, wherein the measuring transducer has two measuring tubes 110, which are held by a support body 120 of the measuring transducer. The measuring tubes communicate with manifolds 130, thus at an inlet side with a first manifold 131 and at an outlet side with a second manifold 132, wherein the first manifold 131 is adapted to receive a medium entering the measuring transducer from a pipeline (not shown) and to distribute it uniformly into the measuring tubes. Correspondingly, the second manifold is adapted to receive medium flowing out of the measuring tubes and to transfer it into the pipeline. The measuring transducer is, in such case, inserted into the pipeline via process connections 140, especially flanges. The measuring transducer includes an oscillation exciter 11, which is adapted to excite the measuring tubes to oscillate. The measuring transducer includes, supplementally, two oscillation sensors 10, which are adapted to register the oscillations of the measuring tubes. The support body 120 is adapted to house the measuring tubes in a support body chamber 121 and to seal them air tightly from their surroundings. The support tube chamber is, in such case, preferably filled with a noncorrosive gas, such as, for example, nitrogen, helium or argon, in order to avoid corrosion of the coil device.

Those skilled in the art are not limited to the numbers of measuring tubes, oscillation exciters and oscillation sensors discussed here. The embodiment shown here is, in this regard, by way of example.

The instrument of the invention includes an electronic measuring/operating circuit 210, which is adapted to operate the oscillation exciter as well as the oscillation sensors, and to calculate and to output mass flow- and/or density measurement values of the medium. The electronic measuring/operating circuit is, in such case, connected by means of electrical connection lines 7 with the oscillation sensors as well as with the oscillation exciter. The instrument includes an electronics housing 220, in which the electronic measuring/operating circuit is arranged. For determining mass flow, the instrument utilizes the Coriolis effect of the medium flowing through the measuring tubes, wherein the flow characteristically influences the measuring tube oscillations.

Figure 2:
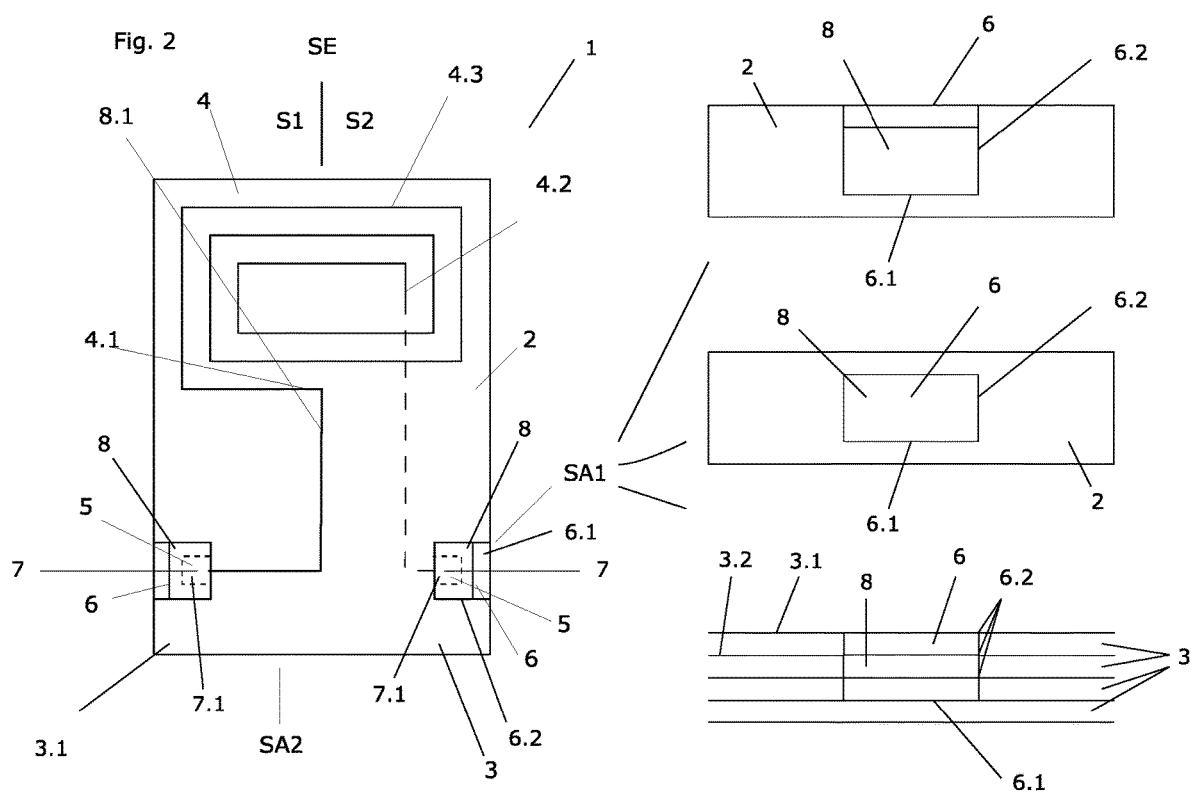
FIG. 2 shows a coil device 1 of the present disclosure.

FIG. 2 shows a plan view of a coil device 1 of the invention with a circuit board 2 having a first face 3.1 and a second face 3.2. A coil 4 having a first coil end 4.1 and a second coil end 4.2 is applied in the form of an electrically conductive trace 4.3, such as shown here, on the first face 3.1. The coil device includes contacting elements 5, thus a first contacting element 5.1 and a second contacting element 5.2. The first contacting element is, in such case, connected with the first coil end 4.1, and the second contacting element is connected with the second coil end 4.2. The contacting elements 5 are, in such case, covered by means of a metal microparticle mass, which, in each case, surrounds an electrical connection line 7 at a first end 7.1.

As shown in FIG. 2 in the lower side view SV1, a circuit board 3 can have a plurality of circuit board layers, wherein a plurality of the circuit board layers can each have a coil. The coils of the plurality of circuit board layers are, in such case, connected via vias (not shown), so that the coils of various circuit board layers produce upon applying an electrical voltage between the vias constructively interfering magnetic fields.

Those skilled in the art can provide coil devices according to their requirements. Those skilled in the art can independently of the number of circuit boards provide more than two contacting elements.

The contacting elements 5 are arranged according to the invention in depressions 6, for example, on floors 6.1 of the depressions. Alternatively, the contacting elements can also be arranged on a border 6.2 of the depression.

The depressions can, such as shown, for example, in the upper and middle side views SV1, be embodied, for example, by cavities in the circuit board, or such as shown in the lower side view SV1, by means of grooves in a coordinated group of circuit board layers. The monolithic group forming a depression can be different for different contacting elements. It is not necessary that all contacting elements be arranged on the same circuit board layer. Instead of a groove, a circuit board layer can also have a lesser dimension than at least one adjoining circuit board layer, so that a contacting element is not covered by the circuit board with lesser dimension. Since the metal microparticle mass can in given cases react with oxygen or other corrosive media, and, thus, can lose a hold and/or electrical conductivity, advantageously the support body chamber is filled with a noncorrosive medium, especially a gas.

Especially in the case of applications with high temperatures above 240° C. or especially above 300° C., a deterioration of the metal microparticle mass can take place in an accelerated manner.

The metal microparticle paste fills, in such case, for example, at least 30% and preferably at least 60% and, especially, at least 80% of a volume of the depression.

It is, in such case, advantageous that the metal microparticle ink wet the border.

Figure 3:
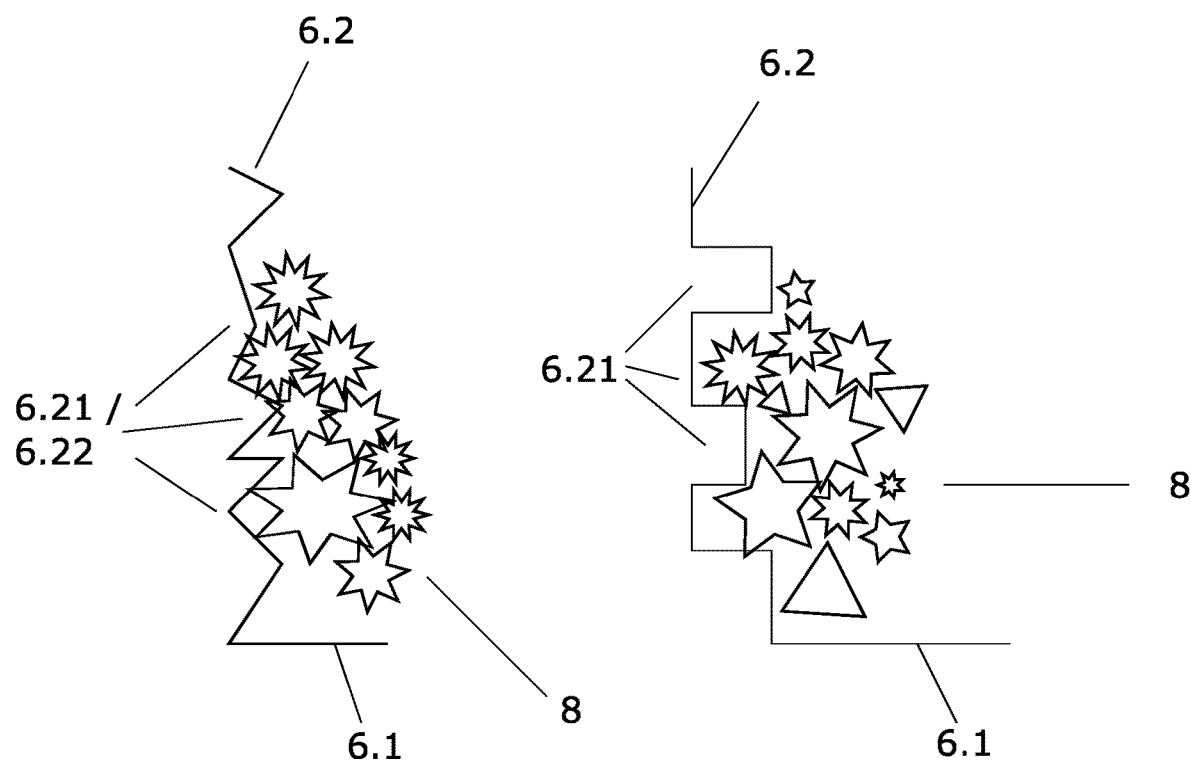
FIG. 3 shows details of a contact region between a border and a metal microparticle mass.

FIG. 3 shows schematic, enlarged details of a contact region between a border 6.2 and particles of the metal microparticle mass 8, wherein the left section has a border with an unevenness, in which particles of the metal microparticle mass engage. The right section shows a border, in the case of which unevenness is produced by different circuit board layers. Also in this case, particles of the metal microparticle mass engage in the resulting unevenness. Alternatively or supplementally, also the floor 6.1 can be uneven.

Figure 4:
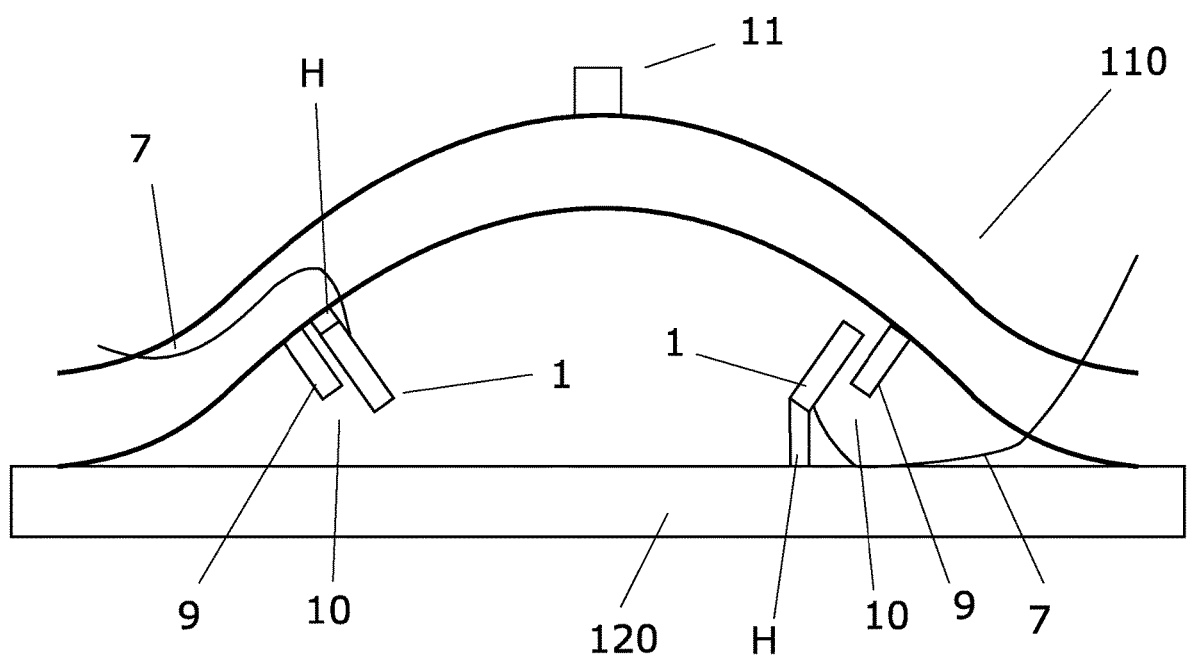
FIG. 4 shows an arrangement of a coil apparatus of the present disclosure on a measuring tube of a measuring transducer.

FIG. 4 shows schematically a side view of a measuring tube 110 of an instrument with two oscillation sensors 10 comprising, in each case, a coil device 1 of the invention seen from a side view SV2, see FIG. 2, wherein the oscillation sensors such as shown in the left region of FIG. 4 are, in each case, connected with the measuring tube 110 by means of a holder H and are adapted to follow its oscillatory movements, or wherein the oscillation sensors are, in each case, mechanically connected by means of a holder H with the support body 120, such as shown in the right region of FIG. 4. Magnet devices 9, which such as shown here are applied on a second measuring tube covered by the shown measuring tube and are adapted to follow its oscillatory movements, interact in measurement operation with their coil devices via electromagnetic fields. In the case of opposing measuring tube oscillations, thus, oscillations are registrable by means of electrical voltages induced in the coil.

In case of coil devices such as shown in the case of the left coil device secured on the measuring tube, the electrical connection lines 7 can be guided on the measuring tube. In case the coil devices are secured on the support body, such as shown in the case of the right coil device, the electrical connection lines can be guided along the support body past the measuring tube.

Alternatively, the measuring transducer can have, for example, only one measuring tube, wherein a magnet apparatus of a particular sensor is secured, for example, on the measuring tube, and its coil device on the support body, or vice versa. Alternatively, the measuring transducer can even have more than two measuring tubes. The at least one measuring tube can, such as shown here, be bent or even be straight over its length. The applicability of the coil devices does not depend on the shape of a measuring tube.

In case the coils are secured on the support body, each measuring tube includes per oscillation sensor a magnet apparatus with, in each case, at least one magnet.

Figure 5:
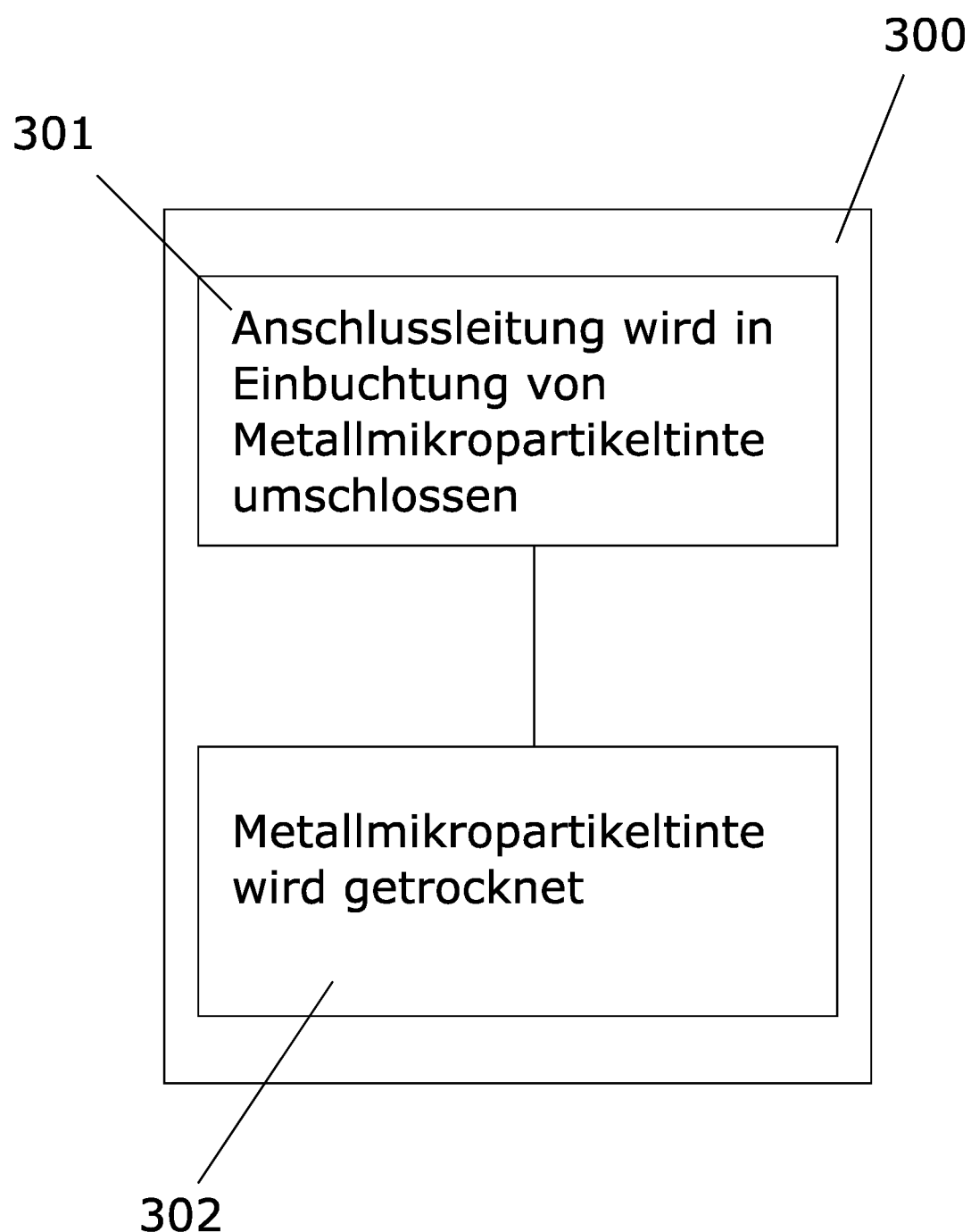
FIG. 5 shows a method for producing a coil device of the present disclosure.

FIG. 5 shows the method steps of a method 300 for producing a coil device 1 of the invention, wherein in a first method step 301 a first end of the electrical connection line is surrounded in the depression by the metal microparticle paste. Such can be accomplished by positioning the first end in the depression and subsequently at least partially filling the depression with the metal microparticle paste, or through at least partially filling the depression with the metal microparticle paste and subsequently introducing the first end of the electrical connection line into the metal microparticle paste in the depression. In a second method step 302, the metal microparticle paste is dried, wherein the drying process results in a hardening of the metal microparticle paste, so that a metal microparticle mass remains. Preferably, particles of the metal microparticle paste have a maximum dimension of less than 50 micrometer, and, especially, less than 35 micrometer and preferably less than 25 micrometer, since, then, an adhesive bonding of the particle relative to one another and to unevenness of the border assures a fixed retention of the metal microparticle mass in the border.

The drying process includes a heating of the metal microparticle paste to a drying temperature of at least 150° C., and, especially, at least 180° C., and preferably at least 210° C., in order to assure a proper hardening of the metal microparticle paste. Furthermore, the drying process can include a holding of the drying temperature for at least 20 minutes, and, especially, at least 35 minutes, and preferably at least 50 minutes, in order to obtain a proper hardening of the metal microparticle paste.

In order to assure a uniform hardening, a temperature change from room temperature to drying temperature and/or from drying temperature to room temperature can comprise a duration of at least 20 minutes, and, especially, at least 35 minutes, and preferably at least 50 minutes.

The drying and the hardening can also include sintering between adjoining particles.

It can be advantageous to perform the drying of the metal microparticle paste in a high pressure atmosphere of at least 3 bar, and preferably at least 5 bar and, especially, at least 10 bar, in order to support sintering between separate particles of the metal microparticle paste.

The invention claimed is:

1. A coil device of an oscillation sensor or oscillation exciter of a measuring transducer or an instrument for measuring a density or a mass flow of a medium flowing through at least one measuring tube of the measuring transducer or instrument, comprising:
 a circuit board having at least one circuit board layer, wherein each circuit board layer has a first face and an opposite, second face,
 at least one coil adapted for registering or producing a time varying magnetic field, wherein the coil is embodied at least sectionally by using an electrically conductive trace, wherein the coil is arranged on the first face or second face of a circuit board layer,
 wherein the at least one coil has a first coil end and a second coil end,
 wherein the coil device has at least one of a plurality of contacting elements connected with the first coil end and at least one of the plurality of contacting elements connected with the second coil end, via which the at least one of the plurality of contacting elements the coil device is connectable using an electrical connection lines to an electronic measuring/operating circuit of an instrument,
 wherein the circuit board has in an edge area at least one depression having a floor and a border,
 wherein at least one of the plurality of contacting elements is arranged on the floor of each depression,
 wherein at least one electrical connection line of the coil device has a first end, the first end is arranged in the depression,
 wherein the depression is filled at least partially with a solid metal microparticle mass, which holds the first end and forms an electrical connection between the electrical connection line and the at least one of the plurality of contacting elements.

2. The coil device of claim 1, wherein the border has in the region of the metal microparticle mass at least sectionally an unevenness in the form of a fluting, which unevenness is adapted to hold the metal microparticle mass.

3. The coil device of claim 1, wherein the metal microparticle mass comprises microparticles of at least one metal of the following list: silver, gold, copper, platinum, tantalum.

4. The coil device of claim 1, wherein the first end of the connection line is at least sectionally bent or folded.

5. A measuring transducer of an instrument for registering a mass flow or a density of a medium flowing through at least one measuring tube of the measuring transducer, comprising:
 the at least one measuring tube having an inlet and an outlet and adapted to convey the medium between inlet and outlet;
 at least one oscillation exciter, which is adapted to excite the at least one measuring tube to execute oscillations;
 at least two oscillation sensors, which are adapted to register deflection of the oscillations of at least one measuring tube;
 wherein at least one oscillation exciter as well as the oscillation sensors have, in each case, a coil device with, in each case, at least one coil, as well as, in each case, a magnet apparatus,
 wherein the magnet apparatus and the coil device are movable relative to one another, and
 wherein the magnet apparatus and the coil device of an oscillation exciter, or oscillation sensor, interact with one another by using magnetic fields,
 wherein the oscillation sensors have, in each case, a coil device, wherein the coil device includes:
  a circuit board having at least one circuit board layer, wherein each circuit board layer has a first face and an opposite, second face,
  at least one coil adapted for registering or producing a time varying magnetic field, wherein the coil is embodied at least sectionally by using an electrically conductive trace, wherein the coil is arranged on the first face or second face of a circuit board layer,
  wherein the at least one coil has a first coil end and a second coil end,
  wherein the coil device has at least at least one of a plurality of contacting elements connected with the first coil end and at least at least one of the plurality of contacting elements connected with the second coil end, via which at least one of the plurality of contacting elements the coil device is connectable by using electrical connection lines to an electronic measuring/operating circuit of an instrument,
  wherein the circuit board has in an edge area at least one depression having a floor and a border,
  wherein at least one of the plurality of contacting elements is arranged on the floor of each depression,
  wherein at least one electrical connection line of the coil device has a first end, the first end is arranged in the depression,
  wherein the depression is filled at least partially with a solid metal microparticle mass, which holds the first end and forms an electrical connection between the electrical connection line and the at least one of the plurality of contacting elements.

6. The measuring transducer of claim 5, wherein the measuring transducer includes a support body with a support body chamber, which is adapted to house, and to seal media tightly from surroundings, the at least one measuring tube, wherein the support body is adapted to support the measuring tube, wherein the at least one coil device is arranged in the support body chamber,
 wherein the support body chamber is filled with a non-corrosive, protective gas, which comprises, for example, nitrogen, helium or argon.

7. The measuring transducer of claim 5, wherein the support body includes a media tight line feedthrough for feedthrough of the electrical connection lines.

* * * * *